Figure 1:
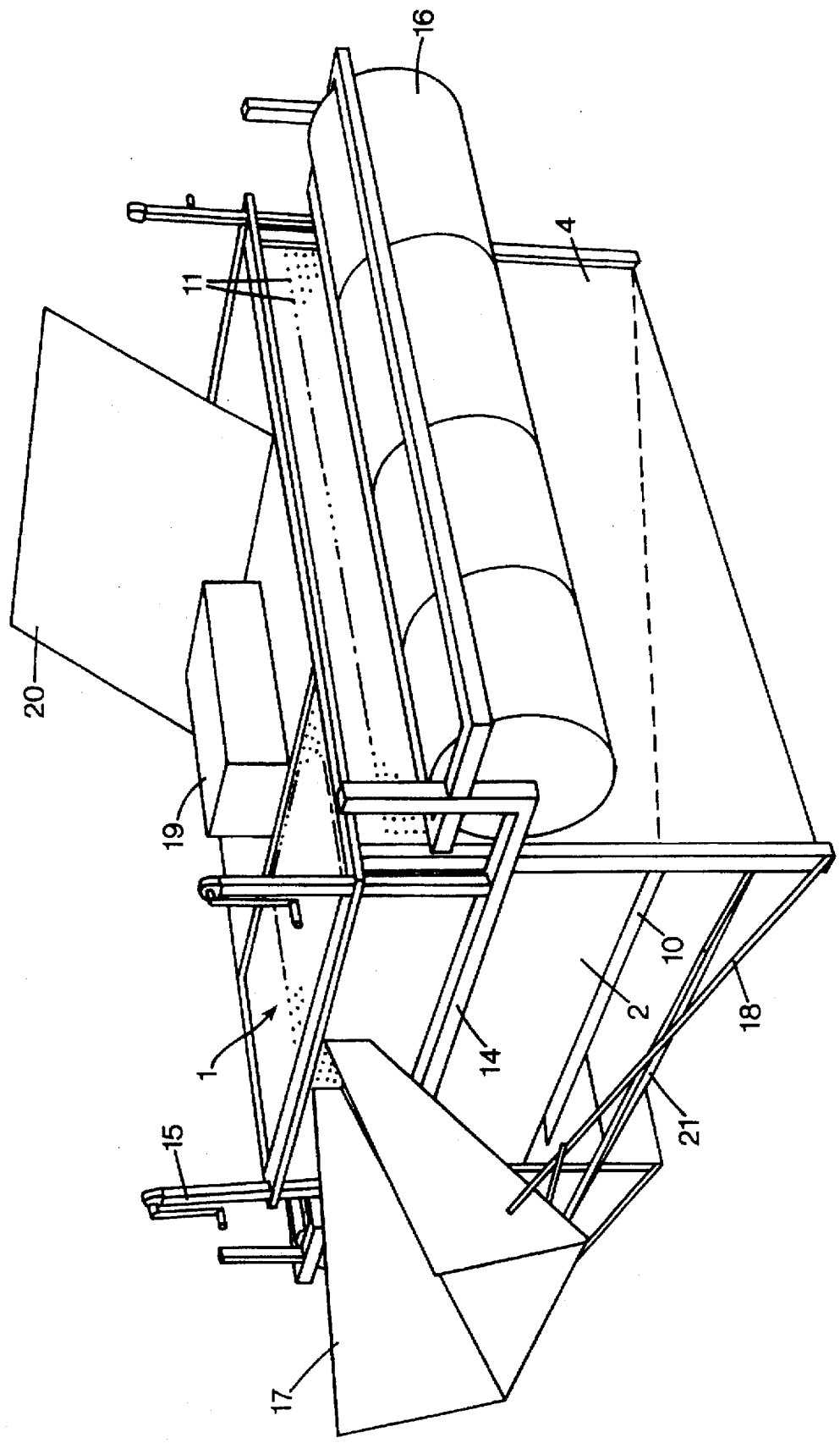

United States Patent [19]
Martelius

[11] Patent Number: 5,715,773
[45] Date of Patent: Feb. 10, 1998

[54] APPARATUS FOR AQUACULTURE

[76] Inventor: Andreas Martelius, Högeruds Gård, S-671 95 Klässbol, Sweden

[21] Appl. No.: 553,353
[22] PCT Filed: May 19, 1994
[86] PCT No.: PCT/SE94/00450
§ 371 Date: Nov. 16, 1995
§ 102(e) Date: Nov. 16, 1995
[87] PCT Pub. No.: WO94/27427
PCT Pub. Date: Dec. 8, 1994

[30] Foreign Application Priority Data

May 26, 1993 [SE] Sweden ............................ 9301781
Mar. 8, 1994 [SE] Sweden ............................ 9400752

[51] Int. Cl.⁶ ........................... A01K 61/00; A01K 63/00
[52] U.S. Cl. ........................................................ 119/223
[58] Field of Search ................................... 119/208, 223, 119/239, 240; 43/6.5

[56] References Cited

U.S. PATENT DOCUMENTS

| | | | |
|---|---|---|---|
| 2,064,408 | 12/1936 | Blecker | 43/6.5 |
| 2,163,282 | 6/1939 | Hovden | 43/6.5 |
| 4,013,042 | 3/1977 | Ingold | 119/223 |
| 4,079,698 | 3/1978 | Neff et al. | 119/223 |
| 4,798,169 | 1/1989 | Rosen et al. | 119/223 |
| 4,839,062 | 6/1989 | Sanders | 43/6.5 X |
| 4,909,186 | 3/1990 | Nakamune et al. | 119/223 |

FOREIGN PATENT DOCUMENTS

| | | | |
|---|---|---|---|
| 2507436 | 12/1982 | France | 119/223 |
| 64-2520 | 1/1989 | Japan . | |
| 626740 | 10/1978 | U.S.S.R. | 119/223 |
| 1117-027 A | 10/1984 | U.S.S.R. . | |
| 1110020 | 4/1968 | United Kingdom . | |
| 2026823 | 2/1980 | United Kingdom . | |

Primary Examiner—Robert P. Swiatek
Assistant Examiner—Elizabeth Shaw
Attorney, Agent, or Firm—Fasth Law Firm

[57] ABSTRACT

An apparatus for aquaculture, in particular for rearing water-dwelling fry, which is intended to be placed preferably in flowing water or water with some wave formation, is kept floating with the aid of floating elements, and consists of a breeding space formed by two end walls, two side walls, and a bottom plate, where the side walls have a number of openings. A flow-intensifying member is arranged in the upper edge of the breeding space. The size of the openings is adjustable.

14 Claims, 2 Drawing Sheets

APPARATUS FOR AQUACULTURE

TECHNICAL FIELD

The present invention relates to an apparatus for aquaculture. In this connection, aquaculture is to be understood as breeding of fish, fish fry, crustaceans and molluscs. In particular, the invention relates to an apparatus for rearing fish fry from the free-swimming fry stage after egg hatching until the young-fish stage has been reached, although the apparatus is also suitable as hatchery equipment for species with attached spawn and for keeping e.g. mother fish.

STATE OF THE ART

Rearing water-dwelling fry and fish has increased in recent years and become all the more important both as a source of income and for the continued existence of many species of fish in places where their natural reproduction grounds have been destroyed or made inaccessible, or where the risk of genetic impoverishment exists. For this reason, many proposals have been made in order to facilitate the rearing of fry and fish where their growth environment can be controlled and they can be protected from external dangers. The majority of these are different types of breeding spaces which are placed in surrounding water and which provide protection for the fry during their growth.

Important factors for the growth environment are the water circulation and thus the oxygenation of the water and the hygiene in the breeding spaces. GB 2 026 823 describes, for example, a breeding space which floats on the water and in which the water circulation is brought about by means of a pump which pumps water into the space and an adjustable outlet. The pump capacity and the outlet opening are adjusted so that a higher water level and thus a higher pressure are obtained in the water in the space, which leads to a circulation of the water in the space. GB 1110 020 describes a breeding space which is lowered into the water, with a pump system which sucks water from the bottom of the space and inlet openings in the upper edge of the side walls of the space in order to bring about a water circulation. The disadvantages with both systems are that for one thing they require pump arrangements with accompanying power requirements, and that adjustment of the water circulation for different conditions cannot be carried out satisfactorily and that cleaning the breeding spaces is relatively complicated. All in all, this means that an optimum breeding environment is difficult to achieve.

DISCLOSURE OF THE INVENTION

The aim of the present invention is to remedy the above disadvantages in a manner which, without pump arrangements, can ensure good water circulation with the aid of a number of adjustment possibilities in order to achieve an optimum breeding environment for the water-dwelling fry in a simple and effective manner. An apparatus is thus proposed which comprises a breeding space which is placed in a suitable watercourse, preferably flowing water such as brook mouths, straits, rivers and open water with some wave formation, and which is kept floating with the aid of floating elements.

The breeding space is defined by two end walls, two side walls and a bottom which slopes from one end wall to the other and in which the side walls have a number of openings, characterized in that a flow-intensifying member is arranged in the upper edge of the breeding space and in that the size of the openings is adjustable. Moreover, the bottom plate has openable sections in its upper and lower pan, the slot-shaped opening of the upper section being directed in the same direction as the flow-intensifying member and a flow being brought about, via an adjusting plate which conducts a flow below the breeding space, along the bottom plate which moves food waste and excrement to the section in the lower pan so that this can easily be removed.

The flow-intensifying member is preferably fixed in an articulated manner on the breeding space so that its outer end can be adjusted in the vertical direction and that the breeding space also can be adjusted in the vertical direction in relation to the floating elements.

PREFERRED EMBODIMENT

Figure 2:
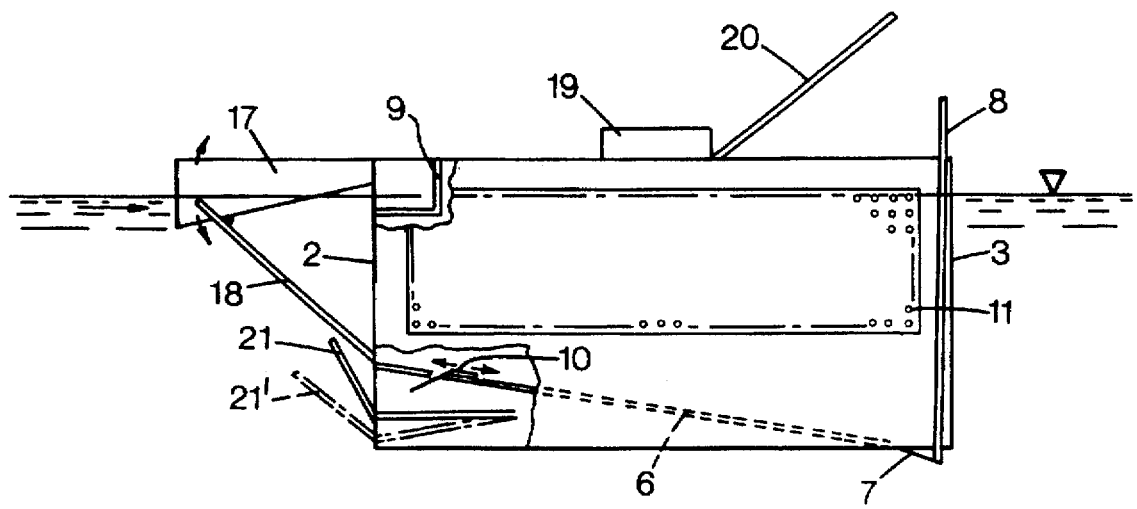
Figure 3:
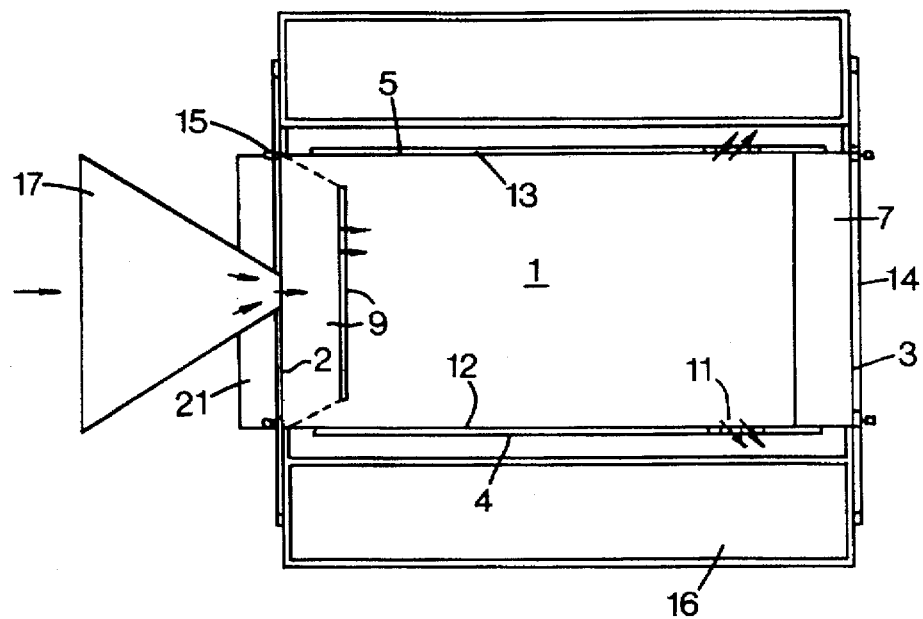

The apparatus according to the invention will be described in detail below in association with a preferred embodiment and with reference to the attached drawings, in which FIG. 1 shows a view in perspective of the apparatus for a preferred embodiment of the invention, FIG. 2 shows a side view of the arrangement in FIG. 1, and FIG. 3 shows a view from above of the arrangement in FIG. 1.

The apparatus for rearing water-dwelling fry according to the invention which is shown in FIGS. 1–3 comprises a breeding space 1 delimited by two end walls 2, 3, two side walls 4, 5 and a bottom plate 6. The walls and the bottom are preferably made from stainless sheet metal, for example SIS 2333 or SIS 2343, but can also be made from any other suitable material such as, for example, aluminium or plastic. The bottom plate 6 is preferably arranged so that it slopes downwards from one end wall 2 to the other end wall 3. At the end wall 3, the bottom plate 6 is designed with a section 7 which is fixed in an articulated manner on the bottom plate 6 and which is manoeuvred with a manoeuvring member 8 in order, in case of need, to create an opening in the lower end of the bottom plate 6.

At the transition between the end wall 2 and the bottom plate 6 and at a distance from the latter, there is an adjusting plate 21 which can be pushed out and can be set in various angular positions. A lower position is designated 21'. The adjusting plate 21 is designed so that its outer part which extends in front of the end wall 2 is angled obliquely upwards while its inner part which is situated below the bottom plate 6 is parallel to the upper edge of the breeding space 1 and is arranged so that it can be pushed parallel thereto in order to increase or reduce the distance between the outer angled pan of the adjusting plate 21 and the transition between the end wall 2 and the bottom plate 6.

At the end wall 2, the bottom plate 6 is designed with a section 10 which is also fixed in an articulated manner on the bottom plate 6 in order to create an adjustable slot-shaped opening for intake of flowing water which is conducted down below the breeding space by virtue of the adjusting plate 21 which can be pushed out. The slot is adjusted with a manoeuvring member 10.

The side walls 4, 5 are provided with a number of openings 11 placed in rows along essentially the entire length of the side walls 4, 5, the rows with openings 11 ending approximately where the end wall 2 merges with the bottom plate 6. These openings 11 can be circular, oval or designed as short slits or in another suitable manner and made by punching, drilling or the like. The size of the openings can be adjusted with a perforated sliding plate 12, 13 with corresponding opening configuration which lies close alongside the inside of the side walls 4, 5.

The walls 2–5 and the bottom 6 form a case or box which is open upwards and which forms the breeding space 1. Arranged around this case is a support frame 14 which is connected to the case via preferably four level-adjusting members 15, one in each corner of the case. Along both the side walls 4, 5 of the case, floating elements 16, in the form of, for example, plastic pipes which are filled with Frigolit, are fixed to the support frame.

In the upper edge of one end wall 2, that is to say the wall which is closest to the openable section 10, a flow-intensifying member 17, which narrows towards the end which is fixed in the wall 2, is mounted in an articulatable manner. The flow-intensifying member 17 is preferably of trough-shaped design but can also have another design. In the upper edge, a box 9 consisting of grating material can be placed for collecting creatures and rubbish and in order to prevent this being flushed into the breeding space 1.

The outer end of the flow-intensifying member 17 can be adjusted in the vertical direction with the aid of, for example, support struts 18 on both sides thereof, or in another suitable manner.

Functioning is as follows. The arrangement for rearing water-dwelling fry is placed in a suitable watercourse, either one which is flowing or in which there is some wave formation. The arrangement floats on the water by virtue of the floating elements 16 and, with the aid of the level-adjusting members 15, the water level in the breeding space can be adjusted. When the breeding space 1 is in its highest position, it is possible to carry out e.g. sorting, catching or treatment of the fish or fry and the bottom can be cleaned. In the lowered position, the arrangement is so stable that a person can stand on the floating elements 16 without a problem.

In order to obtain the best functioning, the arrangement is placed in the water in such a manner that the end wall 2 with the wave-intensifying and flow-intensifying member 17 is directed towards the direction of the flow or waves. The breeding space 1 is then adjusted vertically with the aid of the level-adjusting members 15 and the flow-intensifying member 17 is angled with the aid of the support struts 18 depending upon the flow and wave conditions so that it conducts a given amount of water into the breeding space via the member 17 and brings about refilling with water and a flow and thus oxygenation of the water in the space which then flows out through the openings 11 in the side walls 4, 5. These openings are adjusted with the sliding plates 12, 13 for the prevailing conditions in order to achieve a somewhat higher water level in the breeding space 1 and thus provide for a good throughflow. Desludging of the openings 11 can also be carried out easily by guiding the sliding plates 12, 13 to and fro. By adjusting the size of the openings 11, the arrangement can also be adapted to different fry sizes.

The sliding plate 21 is set so that a suitable quantity of the downward flow is directed in below the breeding space 1. A part of this flow is taken into the breeding space 1 via the slot-shaped opening defined by the section 10 and acts as a cleaning flow along the sloping bottom plate 6, that is to say transports excrement and food residues down towards the lower end of the bottom 6 and the section 7.

On cleaning, the section 7 is opened so that food waste and excrement can be removed simply from the breeding space 1.

All in all, these adjustment possibilities mean that an optimum throughflow and thus a good environment for the water-dwelling fry can be provided for entirely without aids in the form of pumps or the like.

Preferably, the apparatus is also provided with a spring-operated automatic feeder 19 for automatic feeding of the fry.

The arrangement can also be provided with openable protective hatches 20, which are preferably transparent, in order to prevent leaves and other plant pans getting into the breeding space and to prevent gulls and other seabirds gaining access to the fry.

The arrangement according to the invention has a range of advantages compared with o the state of the an as a result of its simple and robust construction and the fact that, as a result of the many adjustment possibilities, it makes possible very good breeding environments for water-dwelling fry with a minimum of care and without aids which are dependent upon electric power. In watercourses without flow and wave formation, however, the arrangement can be provided with a preferably solar-cell operated flow arrangement in order to increase the water throughflow.

From what is indicated, it emerges that the invention cannot be considered to be limited to the preferred embodiment described above and shown in the drawings but can be subject to various modifications within the scope of what is stated in the following patent claims.

I claim:

1. An apparatus for aquaculture for rearing water-dwelling fry, the apparatus is adapted to be floating in flowing water or in water having some wave formation, the apparatus comprising:

a frame;

a floating element attached to the frame;

two opposite end walls;

two opposite side walls placed in between the end walls and attached thereto;

a bottom plate attached to the end walls and the side walls so that the end walls, side walls and the bottom plate form a structure, the structure having an upper edge;

a breeding space defined by the structure;

a flow-intensifying member attached to the upper edge of the structure, the flow-intensifying member having solid walls; and a plurality of openings defined in the structure, the openings having a size that is adjustable.

2. An apparatus according to claim 1 wherein the flow-intensifying member is movably attached to the structure and a portion of the flow-intensifying member is vertically adjustable.

3. An apparatus according to claim 2 wherein the flow-intensifying member has an inflow end and an outflow end, the outflow end is more narrow than the inflow end and the outflow end is attached to the structure.

4. An apparatus according to claim 1 wherein the openings are defined in the side walls and the size of the openings is adjustable by sliding plates attached to the side walls.

5. An apparatus according to claim 1 wherein the structure is vertically adjustable relative to the floating element.

6. An apparatus according to claim 5 wherein the floating element is secured to the frame and the frame is attached to the structure and vertically adjustable relative thereto so that when the apparatus is placed in water, the vertical position of the structure is adjustable relative to a water level of the water.

7. An apparatus according to claim 1 wherein the apparatus has a movable section in the bottom plate that is movable between an open position and a closed position, the movable section is aligned with the flow-intensifying member.

8. An apparatus according to claim 7 wherein the apparatus includes an adjusting plate attached to the frame and positioned below the movable section, the adjusting plate has a front part and a lower part, the front part is angled obliquely upwardly towards the flow-intensifying member and the lower part is substantially parallel to the structure.

9. An apparatus according to claim 8 wherein the front part of the adjusting plate is movable into a position that is parallel to the structure.

10. An apparatus according to claim 7 wherein the bottom plate has a movable portion that is movable between an open position and a closed position, the movable portion is remote from the movable section.

11. An apparatus according to claim 7 wherein the movable section is slot-shaped when the movable section is in the open position.

12. An apparatus according to claim 1 wherein the bottom plate slopes downwardly from one of the end walls attached to the flow-intensifying member towards the opposite end wall.

13. An apparatus according to claim 1 wherein the apparatus has a transparent protective sheet placed on top of the structure.

14. An apparatus for aquaculture for rearing water-dwelling fry, the apparatus is adapted to be floating in flowing water or in water having some wave formation, the apparatus comprising:

a frame;

two opposite end walls;

two opposite side walls placed in between the end walls and attached thereto;

a bottom plate attached to the end walls and the side walls so that the end walls, side walls and the bottom plate from a rectangular-shaped structure, the structure having an upper edge, the bottom plate having a movable section that is movable between an open position and a closed position;

a breeding space defined by the structure;

a floating element attached to the frame, the floating element being vertically adjustable relative to the frame so that when the apparatus is placed in water, the vertical position of the structure is adjustable relative to a water level of the water, the floating element being aligned with the movable section of the bottom plate;

a flow-intensifying member having an inflow end and an outflow end, the outflow end being more narrow than the inflow end, the outflow being movably attached to the upper edge of the structure, the flow-intensifying member having a portion that is vertically adjustable relative to the frame, the bottom plate sloping downwardly and away from the flow-intensifying member;

a plurality of openings defined in the side walls, the openings having a size that is adjustable by sliding plates attached to the side walls;

an adjusting plate attached to the frame, the adjusting plate being positioned below the movable section of the bottom plate, the adjusting plate having a front part and a lower part, the front part being angled obliquely upwardly towards the flow-intensifying member and the lower part being substantially parallel to the structure; and a transparent protective sheet placed on top of the structure.

* * * * *